United States Patent

Preishuberpflügl et al.

Patent Number: 6,028,503
Date of Patent: Feb. 22, 2000

[54] CONTACTLESS DATA TRANSMISSION AND RECEIVING DEVICE WITH A SYNCHRONOUS DEMODULATOR

[75] Inventors: Josef Preishuberpflügl; Siegfried Arnold; Bernhard Spiess; Hubert Watzinger, all of Graz, Austria

[73] Assignee: U.S. Philips Corporation, New York, N.Y.

[21] Appl. No.: 08/963,940

[22] Filed: Nov. 4, 1997

[30] Foreign Application Priority Data

Nov. 5, 1996 [EP] European Pat. Off. .............. 96890170

[51] Int. Cl.⁷ ..................................................... H04Q 7/00
[52] U.S. Cl. ............................................. 340/10.4; 342/42
[58] Field of Search .............................. 340/825.54, 10.4; 342/42, 95; 375/344; 307/10.5

[56] References Cited

U.S. PATENT DOCUMENTS

| | | | |
|---|---|---|---|
| 3,713,149 | 1/1973 | Bruner | 342/95 |
| 4,931,788 | 6/1990 | Creswick | 340/825.54 |
| 5,491,715 | 2/1996 | Flaxl | 375/344 |
| 5,500,651 | 3/1996 | Schuermann | 342/42 |
| 5,616,966 | 4/1997 | Fischer | 307/10.5 |

FOREIGN PATENT DOCUMENTS

0625832A1  11/1994  European Pat. Off. .
0710756A1  5/1996  European Pat. Off. .

*Primary Examiner*—Edwin C. Holloway, III

[57] ABSTRACT

A transmission and receiving device for contact data transmission between the device and a transponder. The transmission and receiving device has an antenna resonant circuit, a synchronous demodulator, a measuring unit, a control unit, and a reference signal generator. In operation, the device and the transponder are inductively coupled to each other through the antenna resonance circuit of the device and an antenna resonance circuit in the transponder. In response to an interrogation by the device, the transponder sends a load modulated digital signal to the device. The synchronous demodulator detects digital response data contained in the load modulated digital signal. The measuring unit measures a phase shift between a reference signal generated by the reference signal generator and a resonance signal generated in the antenna resonance circuit in the device by the sent load modulated digital signal. The control unit controls the synchronous demodulator such that the synchronous demodulator changes its demodulation mode between amplitude demodulation and phase demodulation, in dependence of the measured phase shift.

8 Claims, 3 Drawing Sheets

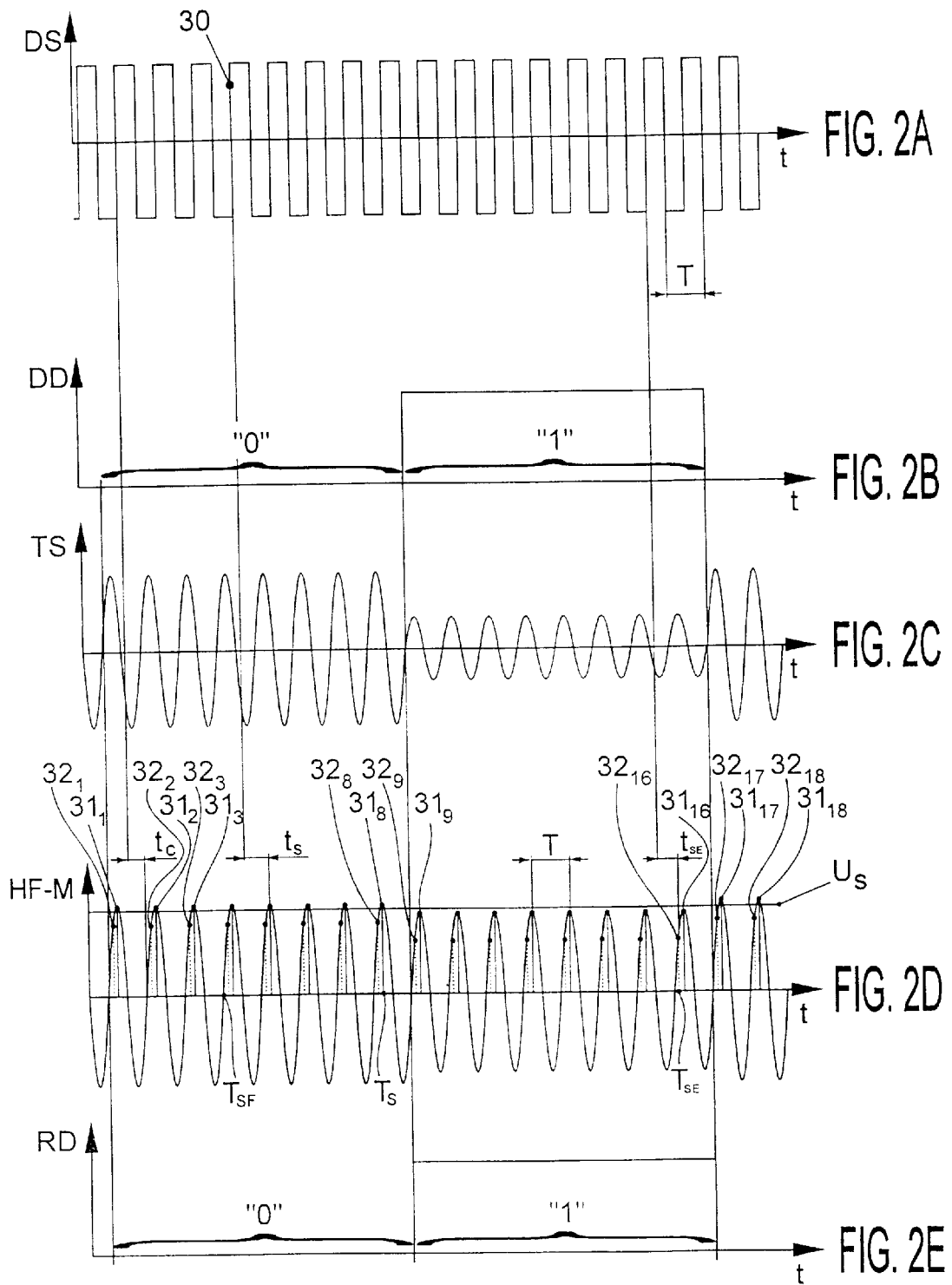

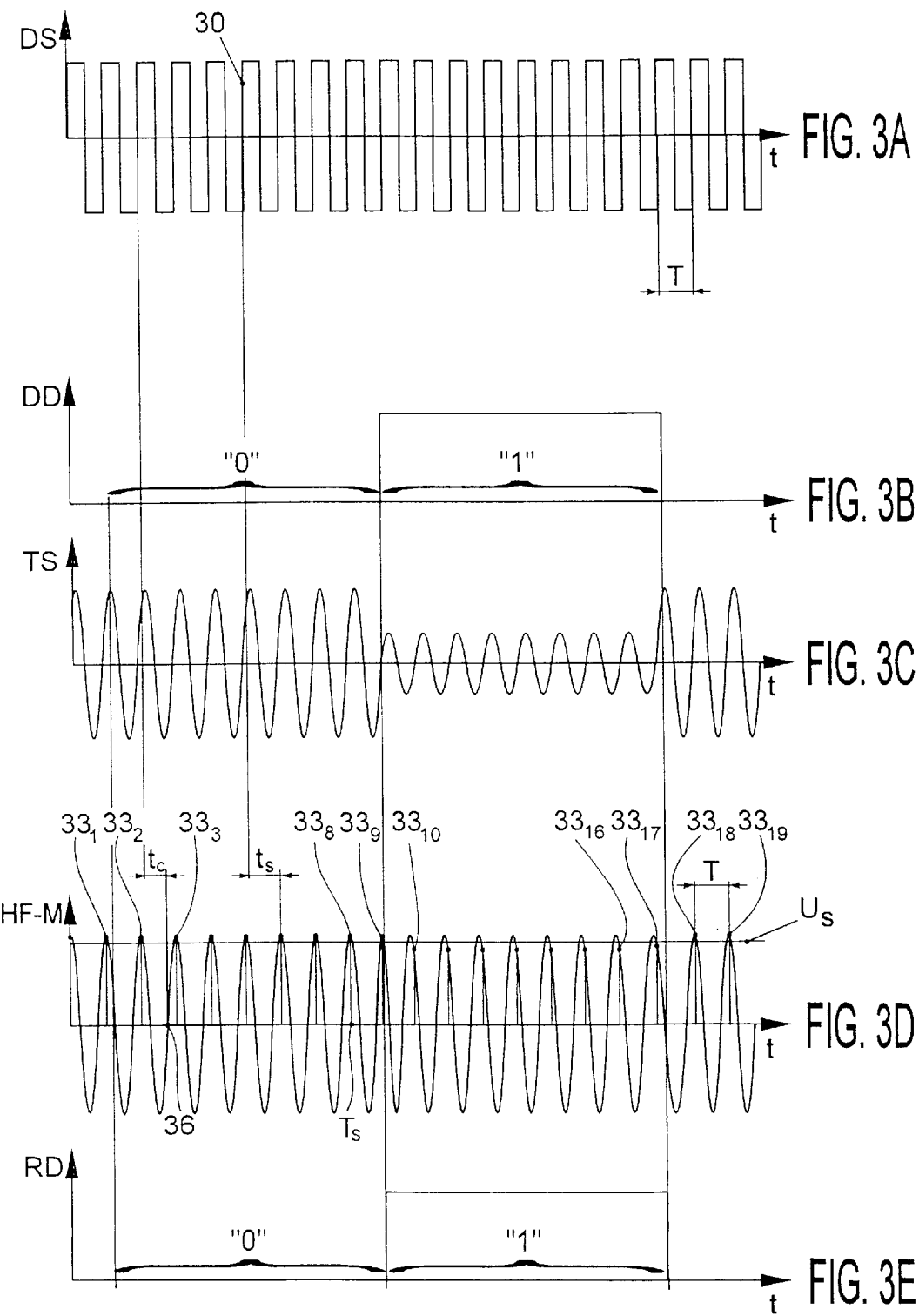

CONTACTLESS DATA TRANSMISSION AND RECEIVING DEVICE WITH A SYNCHRONOUS DEMODULATOR

BACKGROUND OF THE INVENTION

The invention relates to a transmission and receiving device for contactless data transmission between the device and at least one transponder, including a drive stage for generating a drive signal and an antenna resonant circuit which includes a coil and a capacitor, which can receive the drive signal and in which an RF signal occurs which corresponds to the drive signal and can be modulated by load modulation in dependence on data to be transmitted to the transmission and receiving device by a transponder, and also including an evaluation unit which can receive the RF signal for the purpose of evaluation and is arranged to determine data contained in the RF signal due to the load modulation, a measuring unit for determining measurement values of an electric variable which occurs in the antenna resonant circuit, and a control unit for generating control information in dependence on the measurement values determined.

A transmission and receiving device of the kind set forth in the preamble is known, for example from the document EP 0 625 832 A1. The known transmission and receiving device is formed as a read apparatus intended for contactless transmission of energy and data between the apparatus and at least one detection plate which constitutes a transponder.

The known transmission and receiving device includes an antenna resonant circuit which consists of a coil and at least one capacitor which determine the self-resonant frequency of the antenna resonant circuit. The self-resonant frequency of the antenna resonant circuit may deviate from a given nominal self-resonant frequency due to tolerances of components of the transmission and receiving device or due to temperature influences. In the known transmission and receiving device the self-resonant frequency of the antenna resonant circuit of the transmission and receiving device is tuned as well as possible to the given nominal self-resonant frequency by means of an automatic tuning operation which is carried out, for example at regular intervals, resulting in a comparatively good inductive coupling between the antenna resonant circuit of the transmission and receiving device and a transponder antenna resonant circuit of a transponder co-operating with the transmission and receiving device.

To this end, a tuning unit for the antenna resonant circuit, being capable of varying the self-resonant frequency of the antenna resonant circuit, is connected parallel to a main capacitor of the antenna resonant circuit. The tuning unit includes a plurality of parallel-connected additional capacitors which can be connected parallel to the main capacitor of the antenna resonant circuit by control signals which can be applied to the tuning unit and constitute a respective control information, thus enabling variation of the overall capacitance of the respective parallel-connected capacitors of the antenna resonant circuit by the respective control information.

The known transmission and receiving device also includes a measuring unit which measures the voltage across the main capacitor of the antenna resonant circuit and supplies information concerning the voltage across the main capacitor to a control unit in the form of a microcomputer.

The control unit supplies the tuning unit with control information, on the basis of which the overall capacitance of the respective parallel-connected capacitors is varied, so that the self-resonant frequency of the antenna resonant circuit, and hence the voltage across the main capacitor of the antenna resonant circuit, changes. The control unit is informed about the variation of the self-resonant frequency of the antenna resonant circuit via the information concerning the voltage measured across the main capacitor of the antenna resonant circuit by the measuring unit.

During the automatic tuning operation, the control unit of the known transmission and receiving device supplies the tuning unit with control information in order to change the overall capacitance of the respective parallel-connected capacitors of the antenna resonant circuit until the measuring unit measures a maximum voltage across the main capacitor of the antenna resonant circuit at a given nominal self-resonant frequency, i.e. the operating frequency of the transmission and receiving device and the transponder.

A transponder which is intended to co-operate with the known transmission and receiving device is provided with a transponder antenna resonant circuit.

This transponder antenna resonant circuit is inductively coupled to the antenna resonant circuit of the transmission and receiving device in a communication mode, so that a transponder RF signal which corresponds to the RF signal which corresponds in the antenna resonant circuit occurs in the transponder antenna resonant circuit, which transponder RF signal can be load modulated in dependence on digital data that can be read from a memory of the transponder. In the case of a suitable relationship of the self-resonant frequencies of the antenna resonant circuits, the load modulated transponder RF signal causes an amplitude modulated RF signal in the antenna resonant circuit of the transmission and receiving device, due to the inductive coupling of the antenna resonant circuits, the amplitude modulation of the RF signal then containing the digital data transmitted from the transponder to the transmission and receiving device.

In the known transmission and receiving device the data contained in the amplitude modulated RF signal can be extracted in known manner by amplitude demodulation of the amplitude-modulated RF signal by means of the evaluation unit.

The described automatic tuning operation keeps the level of the RF signal at an as high as possible value by the tuning of the antenna resonant circuit at the side of the transmission and receiving device, so that amplitude demodulation of the RF signal so as to extract the digital data is facilitated.

However, it has been found that in the known transmission and receiving device in many cases no digital data can be extracted by amplitude demodulation of the modulated RF signal, despite a high level of the modulated RF signal. This is because, in the case of an unfavorable relation of the self-resonant frequencies of the antenna resonant circuits of the transmission and receiving device and a transponder, the digital data occurs in the modulated RF signal not in the form of an amplitude modulation but in the form of a phase modulation. In these cases, because of the change of modulation no digital data can be extracted by amplitude demodulation in the transmission and receiving device so that the communication between a transponder and the transmission and receiving device is disturbed or interrupted which is, of course, undesirable.

SUMMARY OF THE INVENTION

It is an object of the invention to eliminate the described problems and to provide an improved transmission and receiving device of the kind set forth in the preamble in which the digital data transmitted to the transmission and receiving device by a transponder by modulation of the RF signal occurring in the antenna resonant circuit of the transmission and receiving device can be simply extracted by demodulation of the modulated RF signal even in the case of an unfavorable relation of the self-resonant frequencies of the antenna resonant circuits of the transmission and receiving device and a transponder. This object is achieved in a transmission and receiving device of the kind set forth in the preamble in that the evaluation unit is implemented as a synchronous demodulator which samples the RF signal at sampling instants $T_S$ for the purpose of demodulation, that the measuring unit is arranged to determine a respective phase shift between a reference signal and an electric variable occurring in the antenna resonant circuit, that the control unit and the synchronous demodulator are interconnected, that the control information generated by the control unit can be applied to the synchronous demodulator, and that the sampling instants $T_S$ can be influenced by the control information.

A transmission and receiving device is thus obtained in which only a single, known synchronous demodulator is provided for the demodulation of the modulated RF signal, said synchronous demodulator being capable of suitably performing amplitude demodulation as well as phase demodulation by selection of the sampling instants, and in which the measuring unit and the control unit are arranged to influence the sampling instants $T_S$ in such a manner that when an amplitude modulation occurs in the modulated RF signal the synchronous demodulator automatically performs an amplitude demodulation of the modulated RF signal and when a phase modulation occurs in the modulated RF signal, the synchronous demodulator automatically performs a phase demodulation of the modulated RF signal. To this end, a phase shift, caused by an unfavorable relation of the self-resonant frequencies of the antenna resonant circuits of the transmission and receiving device and a transponder, is determined between the reference signal and an electric variable occurring in the antenna resonant circuit. Control information corresponding to this phase shift is produced in the control unit on the basis of a measured value which is determined by the measuring unit and corresponds to this phase shift, said control information being applied to the synchronous demodulator in order to influence the sampling instants $T_S$ in such a manner that, depending on the relationship of the self-resonant frequencies of the antenna resonant circuits of the transmission and receiving device and a transponder, the appropriate type of demodulation is automatically performed by the synchronous demodulator and also continuous swit$_c$hing between the types of demodulation. It is thus achieved that for relationships of the self-resonant frequencies of the antenna resonant circuits of the transmission and receiving device and a transponder which are situated in a given operating range, the data contained in the modulated RF signal can be extracted by the respective appropriate type of demodulation. The tolerances of the components governing the self-resonant frequencies of the antenna resonant circuits, therefore, may be chosen to be comparatively large, resulting in a cost reduction. The measurement of a value of an electric variable, corresponding to a phase shift, in the antenna resonant circuit by means of the measuring unit can be advantageously performed during communication between the transmission and receiving device and a transponder as well as in situations where no transponder co-operates with the transmission and receiving device.

A transmission and receiving device according to the invention may be provided with, for example a separate RF oscillator for generating the reference signal. It has been found to be advantageous, however, when the measuring unit is connected to the drive stage and when the drive signal can be applied to the measuring unit as the reference signal. The drive stage is then used as a reference signal source at the same time, which is an inexpensive and simple solution.

It has been found to be advantageous when the measuring unit in a transmission and receiving device according to the invention is arranged to determine a respective period of time $t_c$ as the measurement value corresponding to the phase shift between the drive signal and the voltage across the capacitor of the antenna resonant circuit. It has been found in practice that the determination of a measured value $t_c$ corresponding to the phase shift between the drive signal and the voltage across the capacitor of the antenna resonant circuit is simple and attractive because such a voltage can be simply determined.

It has also been found to be advantageous when the control unit in a transmission and receiving device according to the invention is arranged to determine a respective period of time $t_s$ in conformity with the formula $t_s=2(t_c+t_k)$, where $t_k$ is a correction constant and the period of time $t_s$ corresponds to the respective phase shift between the drive signal and the sampling instants $T_S$, and when the control unit is arranged to supply the synchronous demodulator with control information which is dependent on the period of time $t_s$ determined so that the synchronous demodulator samples the RF signal at the sampling instants $T_S$. It is thus achieved that the control unit can be constructed in a comparatively simple manner without using intricate means. Using the above formule, the determination of the control information in the control device is particularly simple.

Furthermore, it has been found to be advantageous when a transmission and receiving device according to the invention includes a correction data memory in which the correction constant $t_k$ can be stored during an initialization operation, and when the correction constant $t_k$ stored in the correction data memory can be applied to the control unit in order to influence a sampling instant $T_S$ to be expected. It is thus achieved that the sampling instant $T_S$ of the synchronous modulator influences the transmission and receiving device and hence can be adapted to one or more transponders of a transponder family wherefrom the transmission and receiving device is to receive digital data and for which it is known how much the self-resonant frequencies of the transponder antenna resonant circuits deviate from a given nominal self-resonant frequency. The correction constant $t_k$ can be permanently stored in the correction data memory in an initialization step during production of the transmission and receiving device or upon installation of the transmission and receiving device, and the transmission and receiving device can thus be adapted to a given transponder family as has been found to be advantageous.

It has also been found to be advantageous when a transmission and receiving device according to the invention includes an input terminal via which the transmission and receiving device can receive the correction constant $t_k$, when the input terminal is connected to the control unit and when the correction constant $t_k$ supplied via the input terminal, can be applied to the control unit in order to influence a sampling instant $T_S$ to be expected. Thus, it is particularly simple to change the correction constant $t_k$ in the transmission and receiving device, and hence to adapt the transmission and receiving device to a plurality of different transponder families, each with different self-resonant frequencies of the transponder antenna resonant circuits.

It has been found that in a transmission and receiving device according to the invention, in which the antenna resonant circuit includes a tuning unit for changing the self-resonant frequency of the antenna resonant circuit, the control unit is connected to the tuning unit and is arranged to tune the antenna resonant circuit to a given nominal self-resonant frequency and to apply the control information to the tuning unit in order to change the self-resonant frequency of the antenna resonant circuit, it is advantageous when the tuning of the self-resonant frequency of the antenna resonant circuit to the given nominal self-resonant frequency can be performed merely by applying control information from the control unit to the tuning unit only once. Thus, the control information generated in the control unit can be additionally used for tuning the self-resonant frequency of the antenna resonant circuit of the transmission and receiving device to a given nominal self-resonant frequency, so that the level of the modulated RF signal can be increased and hence the demodulation of the modulated RF signal in order to extract the digital data is facilitated. Furthermore, any deviation of the self-resonant frequency of the antenna resonant circuit from the given nominal self-resonant frequency can be continuously determined, without disturbing the demodulation of the modulated RF signal for the extraction of the transmitted digital data. A control signal is applied to the tuning unit only in response to the occurrence of a deviation of the self-resonant frequency of the antenna resonant circuit from the given nominal self-resonant frequency, the extraction of the digital data transmitted, however, then being only briefly affected.

BRIEF DESCRIPTION OF THE DRAWINGS

The above and further aspects of the invention will become apparent from and will be elucidated with respect to the embodiment described hereinafter.

The invention will be described hereinafter on the basis of an embodiment shown in the drawings, but the invention is by no means restricted thereto.

FIGS. 2A–2E show signal waveforms which occur in the transmission and receiving device in accordance with the invention and in a transponder arranged for contactless data transmission to the transmission and receiving device, the data transmitted to the transmission and receiving device by the transponder being contained in the RF signal as an amplitude modulation of the RF signal due to load modulation in the transponder.

FIGS. 3A–3E show signal waveforms which occur in the transmission and receiving device in accordance with the invention and in a transponder arranged for contactless data transmission to the transmission and receiving device, the data transmitted to the transmission and receiving device by the transponder being contained in the RF signal as a phase modulation of the RF signal due to load modulation in the transponder.

DETAILED DESCRIPTION OF THE PREFERRED EMBODIMENTS

Figure 1:
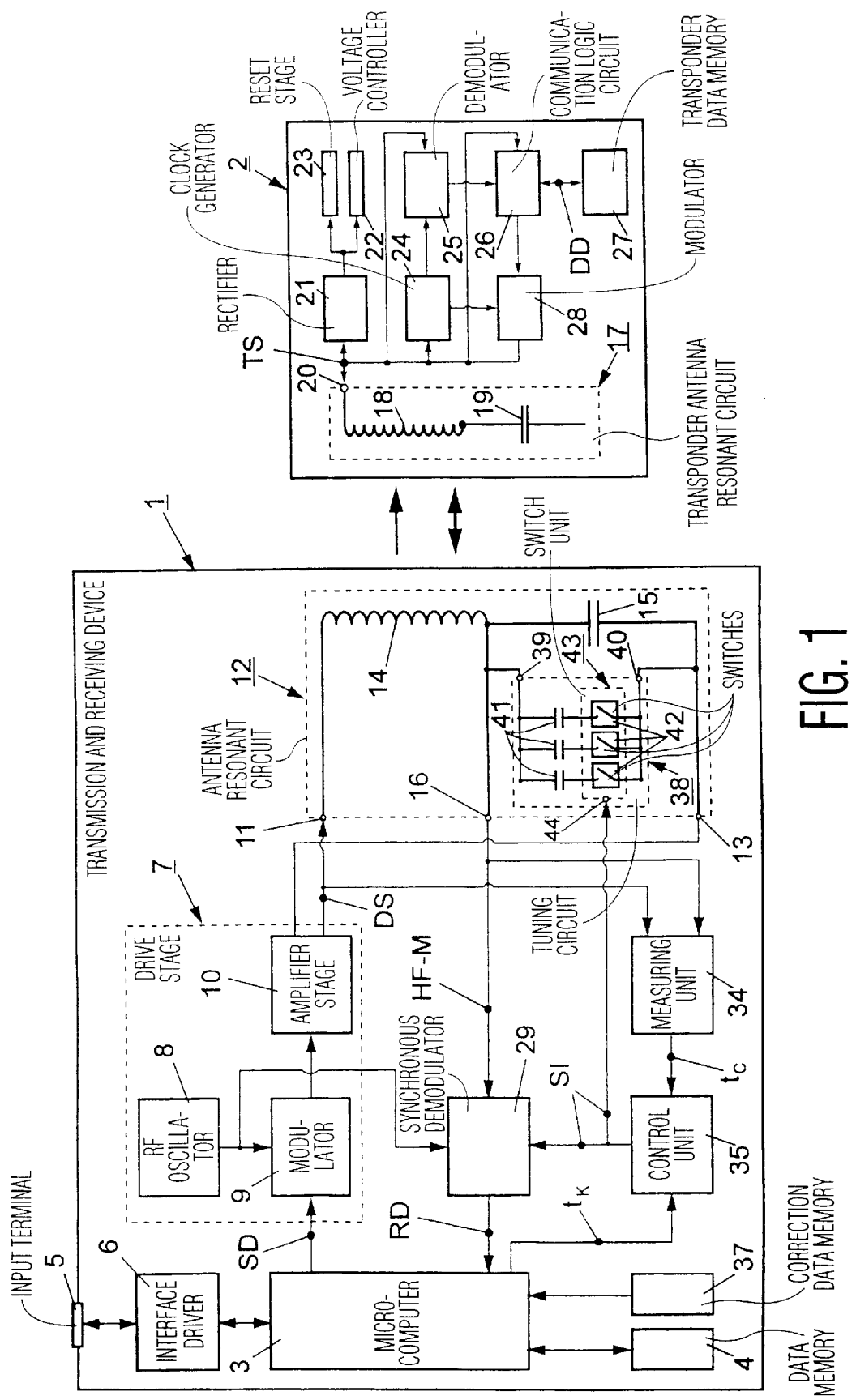
FIG. 1 shows a block diagram of a transmission and receiving device according to the invention for the contactless data transmission between the device and a transponder which is also shown in the form of a block diagram in FIG. 1 and which includes a synchronous demodulator for the demodulation of an RF signal which contains data to be transmitted from the transponder to the transmission and receiving device, which synchronous demodulator samples the RF signal at sampling instants $T_S$, it being possible to influence the instant of occurrence of the sampling instants $T_S$ by means of control information applied to the synchronous demodulator.

FIG. 1 shows a transmission and receiving device 1 for the contactless transmission of energy and data between this device and a transponder 2. Communication between the transmission and receiving device 1 and the transponder 2 includes a transmission mode, in which the transmission and receiving device 1 transmits digital transmission data SD to the transponder 2, as well as a receiving mode in which the transponder 2 transmits digital response data DD to the transmission and receiving device 1, which data is evaluated as digital receiving data RD in the transmission and receiving device 1.

The transmission and receiving device 1 includes a microcomputer 3 which is provided not only for a plurality of control operations, such as the activation of the transmission mode and the receiving mode, but also for the reading of the digital transmission data SD from a data memory 4 connected to the microcomputer 3. Digital transmission data SD can also be applied to the microcomputer 3 by an external apparatus, for example a personal computer, which is connected to an input terminal 5 of the transmission and receiving device 1 via an interface driver 6.

The transmission and receiving device 1 includes a drive stage 7 for generating a drive signal DS which is shown in the FIGS. 2A and 3A and has a period duration T which characterizes the operating frequency of the transmission and receiving device for the communication with the transponder 2. The operating frequency may be, for example 125 kHz. The drive stage 7 includes an RF oscillator 8, a modulator 9 and an amplifier stage 10 in order to generate the drive signal DS. The RF oscillator 8 is arranged to generate and output an oscillator signal, having the operating frequency, to the modulator 9. Digital transmission data SD can be applied to the modulator 9 by the microcomputer 3 in the transmission mode. The modulator 9 performs a pulse width modulation of the oscillator signal with the digital transmission data SD and applies the modulated oscillator signal to the amplifier stage 10. The amplifier stage 10 is arranged to output an amplified, modulated oscillator signal as the drive signal DS to a first terminal 11 of an antenna resonant circuit 12 of the transmission and receiving device 1. The amplifier stage 10 is also arranged to output a 180° phase-shifted, amplified, modulated oscillator signal as a 180° phase-shifted drive signal to a second terminal 13 of the antenna resonant circuit 12. The antenna resonant circuit 12 includes, connected between the terminals 11 and 13, a series connection of a coil 14 and a main capacitor 15 which determine the self-resonant frequency of the antenna resonant circuit 12. The common connection of the coil 14 and the main capacitor 15 is connected to an output 16 of the antenna resonant circuit 12. The drive signal DS, applied to the first terminal 11 of the antenna resonant circuit 12, and the 180° phase-shifted drive signal, applied to the second terminal 13 of the antenna resonant circuit 12, control the antenna resonant circuit 12 in a manner which is known as bridge control, so that an RF signal corresponding to the drive signal DS appears in the antenna resonant circuit 12.

The transponder 2 includes a transponder antenna resonant circuit 17 with a coil 18 and a capacitor 19 which determine the self-resonant frequency of the transponder antenna resonant circuit 17. If the transponder 2 is brought in the vicinity of the transmission and receiving device 1, the RF signal occurring in the antenna resonant circuit of the transmission and receiving device 1 is inductively coupled into the transponder antenna resonant circuit 17 of the transponder 2, thus enabling communication. In the communication mode the RF signal coupled into the transponder antenna resonant circuit 17 serves for data transmission between the transmission and receiving device 1 and the transponder 2 as well as for power supply of the transponder 2 which is constructed exclusively from passive elements.

The free terminal of the coil 18 of the transponder antenna resonant circuit 17 is connected to a terminal 20 of the transponder antenna resonant circuit 17 via which a transponder signal TS, corresponding to the RF signal coupled into the transponder antenna resonant circuit 17, can be output. A rectifier 21 in which the transponder signal TS is rectified so as to form a direct voltage is connected to the terminal 20 of the transponder antenna resonant circuit 17. A voltage controller 22 in which the rectified transponder signal is controlled to a constant voltage is connected to the rectifier 21, said constant voltage being applied, in a manner not shown in FIG. 1, to the units of the transponder 2 for power supply. Furthermore, a reset stage 23 is connected to the rectifier 21, which reset stage generates a reset pulse in response to the first occurrence of a direct voltage produced by the rectifier 21, which reset pulse can be applied, in a manner not shown in FIG. 1, to the units of the transponder 2 so as to initialize the communication operation in the transponder 2.

Furthermore, a clock generator 24 which generates, on the basis of the transponder signal TS, a clock signal having a period duration T characterizing the operating frequency is connected to the terminal 20 of the transponder antenna resonant circuit 17. The clock generator 24 can apply the clock signal to a demodulator 25. The demodulator 25 can also receive the transponder signal TS.

In the transmission mode, the digital transmission data SD to be applied from the transmission and receiving device 1 to the transponder 2 are contained in pulse width modulated form in the drive signal TS output by the drive stage 7. The RF signal corresponding to the drive signal TS is inductively coupled into the transponder antenna resonant circuit 17 by the antenna resonant circuit 12, so that a transponder signal TS occurs which contains the digital transmission data SD and corresponds to the RF signal occurring in the transponder antenna resonant circuit 17. The demodulator 25 demodulates the pulse width modulated transponder signal TS so as to extract the digital transmission data SD transmitted from the transmission and receiving unit 1 to the transponder 2. The extracted digital transmission data SD can be applied from the demodulator 25 to a communication logic circuit 26 of the transponder 2. The extracted digital transmission data SD is processed by the communication logic circuit 26 and can be stored in a transponder data memory 27 by the communication logic circuit 26.

In the receiving mode, the transmission and receiving device 1 and the transponder 2 enable, the transmission of digital response data DD, a data bit "0" and a data bit "1" of which are shown as representatives in the FIGS. 2B and 3B, from the transponder 2 to the transmission and receiving device 1. The transmitted digital response data DD is evaluated in the transmission and receiving device 1, in the case of suitable communication circumstances and correct evaluation, as receiving data RD corresponding to the digital response data DD, a receiving data bit "0" and a receiving data bit "1" thereof being shown as representatives in the FIGS. 2E and 3E. Digital response data DD, stored in the data memory 27, is read from the data memory 27 by the communication logic circuit 26 in the receiving mode so as to be applied to a modulator 28. The clock signal generated by the clock generator 24 can also be applied to the modulator 28.

When the receiving mode is active during the communication operation and the communication logic circuit 26 applies digital response data DD to the modulator 28, the modulator 28 performs a load modulation of the transponder signal TS with the digital response data DD in conformity with the FIGS. 2B and 3B as is shown in the FIGS. 2C and 3C. For load modulation of the transponder signal TS with a data bit "1", the transponder signal TS is loaded with a given resistance value, determining the modulation degree, by the modulator 28 for the duration of the eight-fold period duration T of the clock signal, so that the amplitude values of the loaded transponder signal TS have only a part of the amplitude values of the non-loaded transponder signal TS for this period. For load modulation of the transponder signal TS with a data bit "0", the transponder signal TS remains unloaded by the given resistance, so that the amplitude values of the transponder signal TS remain the same. This transponder signal TS, load-modulated with the digital response data DD, causes a load-modulated RF signal, corresponding to the load-modulated transponder signal TS, in the transponder antenna resonant circuit 17. During a communication operation, the load-modulated RF signal in the transponder antenna resonant circuit 17 of the transponder 2 causes a modulated RF signal in the antenna resonant circuit 12 of the transmission and receiving device 1 which is inductively coupled to the transponder antenna resonant circuit 17. The digital response data DD contained in the modulated RF signal can occur in the form of an amplitude modulation, a phase modulation or a mixture of the two types of modulation, depending on the relationship of the self-resonant frequencies of the antenna resonant circuit 12 of the transmission and receiving device 1 and of the transponder antenna resonant circuit 17 of the transponder 2. In the case of a favorable relationship of the self-resonant frequencies of the antenna resonant circuit 12 of the transmission and receiving device 1 and of the transponder antenna resonant circuit 17 of the transponder 2, in the receiving mode the antenna resonant circuit 12 of the transmission and receiving device 1 can apply, via the output 16, a receiving signal HF-M, shown in FIG. 2D, to an evaluation unit. In the case of such favorable relationships of the self-resonant frequencies of the antenna resonant circuits, the digital response data DD contained in the receiving signal HF-M due to the load modulation, i.e. amplitude modulation, of the transponder signal TS in the modulator 28 of the transponder 2 occur in the form of an amplitude modulation in the receiving signal HF-M. Therefore, the digital receiving data RD can be extracted by amplitude demodulation in the evaluation unit of the receiving and transmission unit 1. However, because of the comparatively weak inductive coupling of the antenna resonant circuit 12 of the transmission and receiving device 1 to the transponder antenna resonant circuit 17 of the transponder 2, the amplitude-modulated receiving signal HF-M has only a comparatively low modulation percentage in comparison with the transponder signal TS.

The evaluation unit in the transmission and receiving device 1 is preferably constructed as a synchronous demodulator 29. The synchronous demodulator 29 is connected to the output 16 of the antenna resonant circuit 12 as an evaluation unit for the evaluation of the receiving signal HF-M. The receiving signal HF-M can be applied to the synchronous demodulator 29. The synchronous demodulator 29 can also receive the oscillator signal from the RF oscillator 8 of the drive stage 7, which oscillator signal corresponds, in respect of phase position and frequency, to the drive signal DS shown in the FIGS. 2A and 3A. The synchronous demodulator 29 samples the receiving signal HF-M for the purpose of demodulation and for extracting the digital receiving data RD at sampling instants $T_S$ which occur each time a period of time $t_s$ after a positive edge 30 of the drive signal DS, which drive signal DS corresponds, in respect of phase position and frequency, to the oscillator signal applied to the synchronous demodulator 29. The amplitude values $31_1$, $31_2$, $31_3$, ..., $31_{18}$ detected at the sampling instants $T_S$ are compared with the amplitude value of a threshold voltage $U_S$ in the synchronous demodulator 29. If the synchronous demodulator 29 detects eight successive amplitude values $31_1$ to $31_8$ at the sampling instants $T_S$ which are larger than the amplitude value of the threshold voltage $U_S$, the synchronous demodulator 29 recognizes a receiving data bit "0". However, if at the sampling instants $T_S$ the synchronous demodulator 29 detects eight successive amplitude values $31_9$ to $31_{16}$ which are smaller than the amplitude value of the threshold voltage $U_S$, the synchronous demodulator 29 recognizes a receiving data bit "1". The synchronous demodulator 29 can output a plurality of such receiving data bits, only the two receiving data bits "0" and "1" thereof being shown in FIG. 2E, as receiving data RD to the microcomputer 3 for further processing. When the synchronous detector 29 samples the receiving signal HF-M shown in FIG. 2D at the sampling instants $T_S$ and detects amplitude values $31_1$ to $31_{18}$, the digital response data DD transmitted by the transponder 2 are correctly evaluated in the transmission and receiving device 1, so that the receiving data RD corresponds to the digital response data DD.

If the receiving signal HF-M is sampled by the synchronous demodulator 29 at the sampling instants $T_{SE}$ which are shown in FIG. 2D and occur each time a period $t_{se}$ after a positive edge 30 of the drive signal TS, the amplitude values $31_1$ to $31_{18}$ are detected which are denoted by dotted lines in FIG. 2D. Because the detected amplitude values $32_1$ to $32_{18}$ are all smaller than the amplitude value of the threshold voltage $U_S$, the synchronous demodulator 29 does not recognize the receiving data bit "1" contained in the receiving signal HF-M, so that the data transmission in the receiving mode from the transponder 2 to the transmission and receiving device 1 is interrupted. As can thus be seen directly, for the demodulation of the receiving signal HF-M so as to extract receiving data RD corresponding to the digital response data DD, an exact temporal relationship should exist between the reference signal (so the drive signal DS) and the sampling instants $T_S$, which relationship can be selected by way of the period of time $t_s$.

It is to be noted that the threshold voltage $U_S$ in a synchronous demodulator can also be dynamically varied and adapted to the detected amplitude values 32. A dynamically adapted threshold voltage $U_S$ is obtained if the threshold voltage $U_S$ is defined, during a periodically executed adaptation operation, for example at the beginning of each communication operation, as the mean value of maximum amplitude values $32_1$ to $32_8$ repeatedly detected at the sampling instants $T_S$ and minimum amplitude values $32_9$ to $32_{16}$ repeatedly detected at the sampling instants $T_S$. If the threshold voltage $U_S$ is dynamically adapted in such a synchronous demodulator in the described manner, the synchronous demodulator detects eight successive amplitude values $32_1$ to $32_8$ which are larger than the adapted threshold voltage $U_S$ and recognizes a data bit "0". Furthermore, the synchronous demodulator detects eight successive amplitude values $32_9$ to $32_{16}$ which are smaller than the adapted threshold voltage $U_S$ and recognizes a data bit "1". Thus, the digital response data DD contained in the receiving signal HF-M are correctly demodulated as receiving data RD. However, even if the threshold voltage $U_S$ is dynamically adapted, the receiving data RD could still be incorrectly demodulated, for example if the receiving channel HF-D is sampled at sampling instants $T_{SF}$ as shown in FIG. 2D and all detected amplitude values amount to "0". Therefore, in a synchronous demodulator in which the threshold voltage $U_S$ is dynamically adapted it is also necessary for the demodulation of the receiving signal HF-M in order to extract the receiving data RD, corresponding to the digital response data DD, that an exactly defined temperal relationship, selectable by the way of the period of time $t_s$, exists between the reference signal (so the drive signal DS) and the sampling instants $T_S$.

In the case of an unfavorable relationship of the self-resonant frequencies of the antenna resonant circuit 12 of the transmission and receiving device 1 and of the transponder antenna resonant circuit 17 of the transponder 2, the antenna resonant circuit 12 of the transmission and receiving device 1 can apply, via the output 16, a receiving signal HF-M as shown in FIG. 3D to the synchronous demodulator 29. In the case of such unfavorable relationships of the self-resonant frequencies, the digital response data DD contained in the receiving signal HF-M due to the load modulation, so amplitude modulation, of the transponder signal TS in the modulator 28 of the transponder 2 do not occur in the form of an amplitude modulation in the receiving signal HF-M, but in the form of a phase modulation. Therefore, the receiving signal HF-M has constant high amplitude values and digital receiving data RD corresponding to the digital response data DD cannot be extracted by amplitude demodulation in the synchronous demodulator 29.

Amplitude values $33_1$ to $33_{19}$ are detected in the synchronous demodulator 29 by selection of appropriate sampling instants $T_S$ which occur periodically with the period duration T, each time a period of time $t_s$ after the positive edge 30 of the drive signal DS. When eight successive amplitude values $33_2$ to $33_9$ larger than the amplitude value of the threshold voltage $U_S$ are detected in the synchronous demodulator 29 at the sampling instants $T_S$, the synchronous demodulator 29 recognizes a receiving data bit "0". When at sampling instants $T_S$ in the synchronous demodulator 29 eight successive amplitude values $33_{10}$ to $33_{17}$ are detected which are smaller than the amplitude value of the threshold voltage $U_S$, the synchronous demodulator 29 recognizes a receiving data bit "1". The receiving data bits are recognized and applied to the microcomputer 3 as receiving data RD by sampling at the sampling instants $T_S$ selected in FIG. 3D, even in the case of an unfavorable relationship of the self-resonant frequencies of the antenna resonant circuit 12 of the transmission and receiving device 1 and of the transponder antenna resonant circuit 17 of the transponder 2, in which case the digital receiving data RD are contained in the receiving signal HF-M in the form of a phase demodulation. The receiving data RD applied to the microcomputer 3 is processed by the microcomputer 3 and stored in the data memory 4 or is applied from the microcomputer 3, via the interface driver 6, to an external apparatus, connected to the input terminal 5, for further processing.

In order to enable the communication operation between the transponder 2 and the transmission and receiving device 1 regardless of the relationship of the self-resonant frequencies of the antenna resonant circuits 12 and 17, the transmission and receiving device 1 is attractively provided with a measuring unit 34 and a control unit 35. The measuring unit 34 and the control unit 35 are arranged to determine the respective appropriate period of time $t_s$ and hence to determine the respective appropriate sampling instants $T_S$.

The measuring unit 34 is arranged to determine a respective phase shift between a reference signal and an electric variable occurring in the antenna resonant circuit 12. The measuring unit 34 is connected to the driver stage 7 and the measuring unit 34 can receive the drive signal DS from the driver stage 7 as the reference signal. Furthermore, the measuring unit 34 can receive the receiving signal HF-M which is supplied via the output 16 of the antenna resonant circuit 12 and corresponds to the voltage across the main capacitor 15 of the antenna resonant circuit 12. The measuring unit 34 is arranged to determine a respective period of time $t_c$ as a measurement value which corresponds to the phase shift between the drive signal DS and the voltage across the main capacitor 15 of the antenna resonant circuit and is measured from a positive edge 30 of the drive signal DS to a zero crossing of a positive edge 36 of the receiving signal HF-M. The period of time $t_c$ thus determined is dependent on the respective relationship of the self-resonant frequencies of the antenna resonant circuit 12 of the transmission and receiving device 1 and of the transponder antenna resonant circuit 17 of the transponder 2 and, therefore, can be advantageously used for calculating the appropriate period of time $t_s$ and hence for determining the appropriate sampling instants $T_S$ for the demodulation of the receiving signal HF-M. The period of time $t_c$ determined in the measuring unit 34 can be applied to the control unit 35.

In dependence on the period of time $t_c$ determined and hence in dependence on the respective relationship of the self-resonant frequencies of the antenna resonant circuits 12 and 17, the control unit 35 calculates the respective appropriate and most advantageous period of time $t_s$, and hence the occurrence of the sampling instants $T_S$ in conformity with the formula $t_s=2(t_c+t_k)$, where $t_k$ forms a correction constant. The control unit 35 is also arranged to generate control information SI which is dependent on the period of time $t_s$ determined and to apply the control information SI thus generated to the synchronous demodulator 29 so that in order to extract the receiving data RD the synchronous demodulator 29 samples the receiving signal HF-M in dependence on the respective relationship of the self-resonant frequencies of the antenna resonant circuits 12 and 17 at the respective appropriate sampling instants $T_S$.

The sampling instant $T_S$ of the synchronous demodulator 29 of the transmission and receiving device 1 can be influenced by choosing the correction constant $t_k$. If at the time of production or installation of the transmission and receiving device 1 it is known that the transmission and receiving device 1 is intended to co-operate with a plurality of transponders 2 belonging to a transponder family with transponder antenna resonant circuits 17 whose self-resonant frequencies deviate from a given self-resonant frequency, i.e. the self-resonant frequency of the antenna resonant circuit 12 of the transmission and receiving device 1, by a given amount so that the relationship of the self-resonant frequencies is known, a presumably appropriate sampling instant $T_S$ can then be influenced by selection of the correction constant $t_k$. The correction constant $t_k$ is in this case stored in a correction data memory 37. In the receiving mode the correction data memory 37 is read by the microcomputer 3 which outputs the correction constant $t_k$ to the control unit 35 in order to calculate the presumably appropriate period of time $t_s$ for the sampling of the receiving signal HF-M at presumably appropriate sampling instants $T_S$. The calculation of the presumably appropriate period of time $t_s$ while utilizing the correction constant $t_k$ read from the correction data memory 37 in order to adapt the transmission and receiving device 1 to a given transponder family has proved to be advantageous in practice.

A correction constant $t_k$ can also be applied to the transmission and receiving device 1 by an external apparatus connected to the input terminal 5, for example a personal computer; this correction constant $t_k$ can be applied, via the interface driver 6 and the microcomputer 3, to the control unit 35 in order to preset a sampling instant $T_S$ to be expected. The correction constant $t_k$ can thus be particularly simply changed in the transmission and receiving device 1 and hence the transmission and receiving device 1 can be particularly simply adapted to a plurality of different transponder families with transponders having different respective self-resonant frequencies of the transponder antenna resonant circuits 17.

The antenna resonant circuit 12 of the transmission and receiving device 1 also includes a tuning unit 38 for changing the self-resonant frequency of the antenna resonant circuit 12 and for adjusting the self-resonant frequency of the antenna resonant circuit 12 to a given nominal self-resonant frequency. The tuning unit 38 includes a first terminal 39 which is connected to the output 16 of the antenna resonant circuit 12 and a second terminal 40 which is connected to the second terminal 13 of the antenna resonant circuit 12 so that the tuning unit 38 is connected parallel to the main capacitor 15 of the antenna resonant circuit 12. The tuning unit 37 comprises three capacitors 41, one terminal of each of which is connected to the first terminal 39 of the tuning unit 38 and the other terminal of which is connected to a respective swit$_c$h 42 of a swit$_c$h unit 43. The ends of the swit$_c$hes 42 which are remote from the capacitors 41 are connected to the second terminal 40 of the tuning unit 38. The swit$_c$h unit 43 includes a control input 44. Control signals which determine the swit$_c$hing state of the three swit$_c$hes 42 can be applied to the control input 44 of the swit$_c$h unit 43.

The output of the control unit 35 is connected to the control input 44 of the swit$_c$h unit 43 so that the control information SI to be applied to the synchronous demodulator 29 can be applied to the control input 44 of the swit$_c$hing unit 43 as a control signal. The swit$_c$hing states of the three swit$_c$hes 42 can be changed in dependence on the control information SI applied to the control input 44 as a control signal by the swit$_c$h unit 43, so that the three capacitors 41 can be selectably connected in parallel with the main capacitor 15 of the antenna resonant circuit 12, thus enabling the self-resonant frequency of the antenna resonant circuit 12 to be changed.

The respective period of time $t_c$ determined by the measuring unit 34 is dependent on the deviation of the self-resonant frequency of the antenna resonant circuit 12 from a given nominal self-resonant frequency, i.e. the operating frequency with the period duration T. The control information SI, generated in dependence on the respective period of time $t_c$ determined by the control unit 35, can be applied to the tuning unit 38 in order to change the self-resonant frequency of the antenna resonant circuit 12 to the given nominal self-resonant frequency. Because the control unit 35, via the respective period of time $t_c$ determined by the measuring unit 34, not only receives information indicating that the self-resonant frequency of the antenna resonant circuit deviates from the reference self-resonant frequency but the amount of the period of time $t_c$ is a measure of the magnitude of the deviation of the self-resonant frequency of the antenna resonant circuit 12 from the nominal self-resonant frequency, the tuning of the self-resonant frequency of the antenna resonant circuit 12 to the given nominal self-resonant frequency can be performed by the control unit 35 by applying control information SI, determining the switching states of the three switches 42, to the tuning unit 38 only once.

The control information SI generated in the control unit 35 can thus be advantageously used additionally for tuning the self-resonant frequency of the antenna resonant circuit 12 of the transmission and receiving device 1 to a given nominal self-resonant frequency, so that the level of the receiving signal HF-M containing the digital response data DD can be maintained at an as high as possible level, thus facilitating the demodulation of the receiving signal HF-M so as to extract receiving data RD corresponding to the digital response data DD. Furthermore, any deviation of the self-resonant frequency of the antenna resonant circuit 12 from the given nominal self-resonant frequency can be continuously determined without disturbing the reception and the demodulation of the receiving signal HF-M for the extraction of the receiving data RD. It is only when a given deviation of the self-resonant frequency of the antenna resonant circuit 12 from the given nominal self-resonant frequency occurs that a control information SI is applied to the tuning unit 38, the extraction of the receiving data RD then being briefly influenced by the sudden amplitude variation of the receiving signal HF-M due to the changing of the self-resonant frequency of the antenna resonant circuit 12.

It is to be noted that the tuning unit 38 for tuning the self-resonant frequency of the antenna resonant circuit 12 to a given nominal self-resonant frequency may include a plurality of capacitors and switches so as to enable exact as possible tuning of the self-resonant frequency to the nominal self-resonant frequency.

It is also to be noted that the control unit 35 for generating the control information SI may also be partly or completely formed by the microcomputer 3, offering an economical implementation of the control unit 35.

Furthermore, it is to be noted that the measuring unit 34 may also be arranged to analyze the receiving signal HF-M in respect of its transient response upon transition of the digital response data DD contained in the receiving signal HF-M from a data bit "0" to another data bit "1" or vice versa, and to extract analysis values. Because the transient response of the receiving signal HF-M is dependent on the relationship of the self-resonant frequencies of the antenna resonant circuits, the analysis values determined are also dependent on the relationship of the self-resonant frequencies of the antenna resonant circuits. These analysis values can be applied to the control unit 35 in order to generate control information SI so as to define the period of time $t_s$ and hence to sample the receiving signal HF-M at the appropriate sampling instants T, by the synchronous demodulator 29.

The invention is not restricted to the described embodiment of a transmission and receiving device. For example, the steps according to the invention for determining and defining the respective appropriate sampling instants $T_S$ in a synchronous demodulator of a transmission and receiving device for the demodulation of the receiving signal HF-M are also attractive if the transmission and receiving device operates in a communication mode with a transponder which includes an energy source, for example, a battery or an accumulator, and hence does not extract the energy for powering the units of the transponder from the RF signal from the transmission and receiving device.

It is also to be noted that the coding of the digital response data DD chosen in a transponder co-operating with a transmission and receiving device is not linked to the steps according to the invention. For example, for the load modulation of the transponder signal TS with a digital data bit "0", the transponder signal TS can be loaded with a given resistance value by a modulator, for example for the duration of the 50-fold period duration T of the clock signal, the amplitude values of the loaded transponder signal TS amounting to only a part of the amplitude values of the non-loaded transponder signal TS for this duration.

Furthermore, it is to be noted that a measuring unit may also be arranged to determine a respective phase shift between a reference signal, preferably the drive signal DS, and the current flowing through the coil of the antenna resonant circuit of a transmission and receiving device according to the invention.

What is claimed is:

1. A transmission and receiving device for contactless data transmission between the device and a transponder, the transmission and receiving device comprising a drive stage for generating a drive signal and a first antenna resonant circuit which includes a coil and a capacitor, the transponder comprising a second antenna resonance circuit, the drive signal being supplied to the first antenna resonance circuit, an RF signal occurring in the first antenna resonance circuit corresponding to the drive signal, and the RF signal being modulateable by load modulation in dependence on data to be transmitted to the transmission and receiving device by a transponder, the transmission and receiving device comprising an evaluation unit to which the RF signal is supplied for the purpose of evaluation, the evaluation unit being arranged to determine data contained in the RF signal due to the load modulation, and the transmission and receiving device comprising a measuring unit for determining measurement values of an electric variable which occurs in the first antenna resonant circuit, and a control unit for generating control information in dependence on the measurement values determined, characterized in that the evaluation unit is implemented as a synchronous demodulator which samples the RF signal at sampling instants for the purpose of demodulation, that the measuring unit is arranged to determine a respective phase shift between a reference signal and the electric variable, that the control unit and the synchronous demodulator are interconnected, that the control information generated by the control unit is applied to the synchronous demodulator, and that the sampling instants are automatically influenced by the control information in accordance with the determined phase shift, so as to adapt the sampling instances to a mode change of the synchronous demodulator between an amplitude demodulation mode and a phase demodulation mode.

2. A transmission and receiving device as claimed in claim 1, wherein the measuring unit is connected to the drive stage, the drive signal being the reference signal.

3. A transmission and receiving device as claimed in claim 2, wherein the measuring unit is arranged to determine a respective period of time $t_c$ as the measurement value corresponding to the phase shift between the drive signal and the voltage across the capacitor of the antenna resonant circuit.

4. A transmission and receiving device as claimed in claim 3, wherein the control unit is arranged to determine a respective period of time $t_s$ in conformity with the formule $t_s = 2(t_c + t_k)$, where $t_k$ is a correction constant and the period of time $t_s$ corresponds to the respective phase shift between the drive signal and the sampling instants $T_S$, and that the control unit is arranged to supply the synchronous demodulator with control information which is dependent on the period of time $t_s$ determined so that the synchronous demodulator samples the RF signal at the sampling instants $T_S$.

5. A transmission and receiving device as claimed in claim 4, wherein the transmission and receiving device includes a correction data memory in which the correction constant $t_k$ can be stored during an initialization operation, and that the correction constant $t_k$ stored in the correction data memory is applied to the control unit in order to influence a sampling instant $T_S$ to be expected.

6. A transmission and receiving device as claimed in claim 4, wherein the transmission and receiving device includes an input terminal via which the transmission and receiving device receives the correction constant $t_k$, that the input terminal is connected to the control unit and that the correction constant $t_k$, supplied via the input terminal, is applied to the control unit in order to influence a sampling instant $T_S$ to be expected.

7. A transmission and receiving device as claimed in claim 1, wherein the antenna resonant circuit includes a tuning unit for changing the self-resonant frequency of the antenna resonant circuit, the control unit is connected to the tuning unit and is arranged to tune the antenna resonant circuit to a given nominal self-resonant frequency and to apply the control information to the tuning unit in order to change the self-resonant frequency of the antenna resonant circuit, the tuning unit being tunable merely by applying control information from the control unit to the tuning unit only once.

8. A transmission and receiving device for contactless data communication between the device and a transponder through resonant coupling of a first antenna resonant circuit comprised in said device and a second antenna resonant circuit comprised in said transponder, said device comprising:

transmit means for transmitting modulated first data to said transponder, said transmit means comprising a driver stage for driving said first antenna resonant circuit with said modulated first data; and receive means for receiving amplitude modulated second data from said transponder in response to said modulated first data, said receive means comprising a synchronous demodulator for sampling said received modulated second data at sampling instants, said synchronous demodulator being coupled to said driver stage and receiving a reference signal from said driver stage, said receive means further comprising a measurement and control unit which is coupled to said driver stage, to said synchronous detector, and to said first antenna resonant circuit, said measurement and control unit being arranged for measuring a phase shift between said reference signal and an electric signal occurring in said first antenna resonant circuit due to reception of said modulated second data signal, and for controlling said sampling instants relative to a phase of said reference signal in dependence of said measured phase shift, so as to cause a mode change of said synchronous demodulator between an amplitude demodulation mode and a phase demodulation mode.

* * * * *